(12) United States Patent
Magaldi et al.

(10) Patent No.: US 12,441,550 B2
(45) Date of Patent: Oct. 14, 2025

(54) BELT TRANSPORT SYSTEM FOR HIGH FLOWS OF BULK MATERIAL

(71) Applicant: MAGALDI POWER S.P.A., Rome (IT)

(72) Inventors: Mario Magaldi, Salerno (IT); Paolo Magaldi, Salerno (IT); Domenico Casillo, Buccino (IT); Daniele Ricci, Acerra (IT)

(73) Assignee: MAGALDI POWER S.P.A., Rome (IT)

( * ) Notice: Subject to any disclaimer, the term of this patent is extended or adjusted under 35 U.S.C. 154(b) by 147 days.

(21) Appl. No.: 18/551,918

(22) PCT Filed: Mar. 23, 2022

(86) PCT No.: PCT/IB2022/052640
§ 371 (c)(1),
(2) Date: Sep. 22, 2023

(87) PCT Pub. No.: WO2022/201049
PCT Pub. Date: Sep. 29, 2022

(65) Prior Publication Data
US 2024/0158178 A1    May 16, 2024

(30) Foreign Application Priority Data
Mar. 23, 2021 (IT) .......... 102021000007001

(51) Int. Cl.
*B65G 17/12* (2006.01)
*B65G 17/36* (2006.01)
*B65G 45/10* (2006.01)

(52) U.S. Cl.
CPC ............ *B65G 17/12* (2013.01); *B65G 17/36* (2013.01); *B65G 45/10* (2013.01)

(58) Field of Classification Search
CPC ........ B65G 17/12; B65G 17/36; B65G 45/10; B65G 19/04; B65G 17/10
USPC ................................................ 198/711–713
See application file for complete search history.

(56) References Cited

U.S. PATENT DOCUMENTS

| | | |
|---|---|---|
| 3,112,822 A | 12/1963 | Meyfarth, Jr. |
| 3,970,190 A | 7/1976 | Kovats |
| 4,019,625 A * | 4/1977 | Wiese ................... B65G 17/36 198/708 |
| 4,200,184 A * | 4/1980 | Tripoteau ............. B65G 17/365 198/701 |

(Continued)

FOREIGN PATENT DOCUMENTS

DE    1756551 A1    4/1970

OTHER PUBLICATIONS

International Search Report and Written Opinion for Corresponding International Application No. PCT/IB2022/052640, 10 pages, Jul. 18, 2022.

*Primary Examiner* — Mark A Deuble
(74) *Attorney, Agent, or Firm* — LUCAS & MERCANTI, LLP

(57) ABSTRACT

A transport system for high temperature bulk materials in industrial plants, having a plurality of volumetric containers arranged in sequence along a direction of transport and fastened to a movable conveyor belt, which containers have lateral walls which engage mutually to form a continuous transport region.

17 Claims, 4 Drawing Sheets

(56) References Cited

U.S. PATENT DOCUMENTS

| | | | | |
|---|---|---|---|---|
| 4,246,999 A * | 1/1981 | Bryant | ................... | B65G 17/36 |
| | | | | 198/713 |
| 4,736,832 A * | 4/1988 | Rinio | ................... | B65G 17/126 |
| | | | | 198/712 |
| 5,143,203 A * | 9/1992 | Hinner | ................ | B65G 17/126 |
| | | | | 198/708 |
| 5,526,922 A | 6/1996 | Clark | | |
| 5,833,047 A * | 11/1998 | Howe | ................... | B65G 17/10 |
| | | | | 198/708 |
| 6,334,527 B1 * | 1/2002 | Kitamura | ............. | B65G 17/123 |
| | | | | 198/477.1 |
| 2015/0144463 A1 * | 5/2015 | Furthmann | .......... | B65G 17/126 |
| | | | | 198/713 |

\* cited by examiner

L ⟹ V

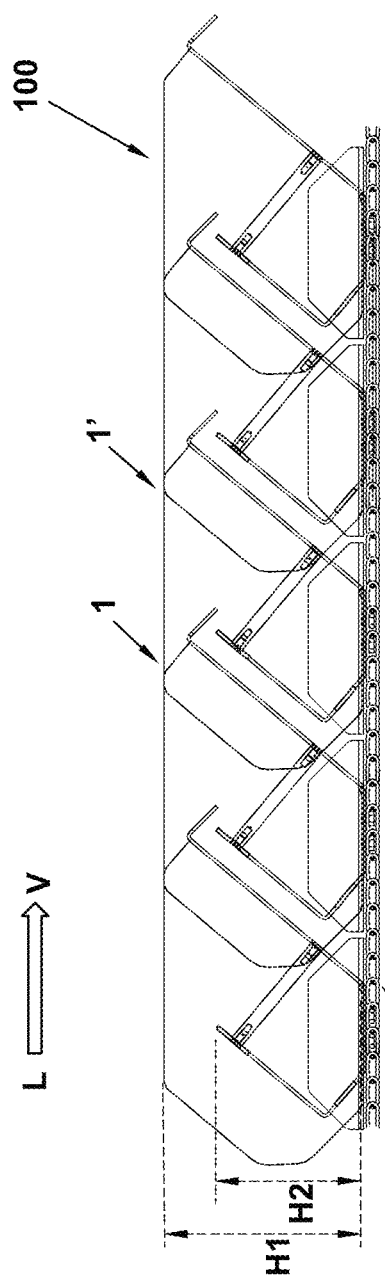
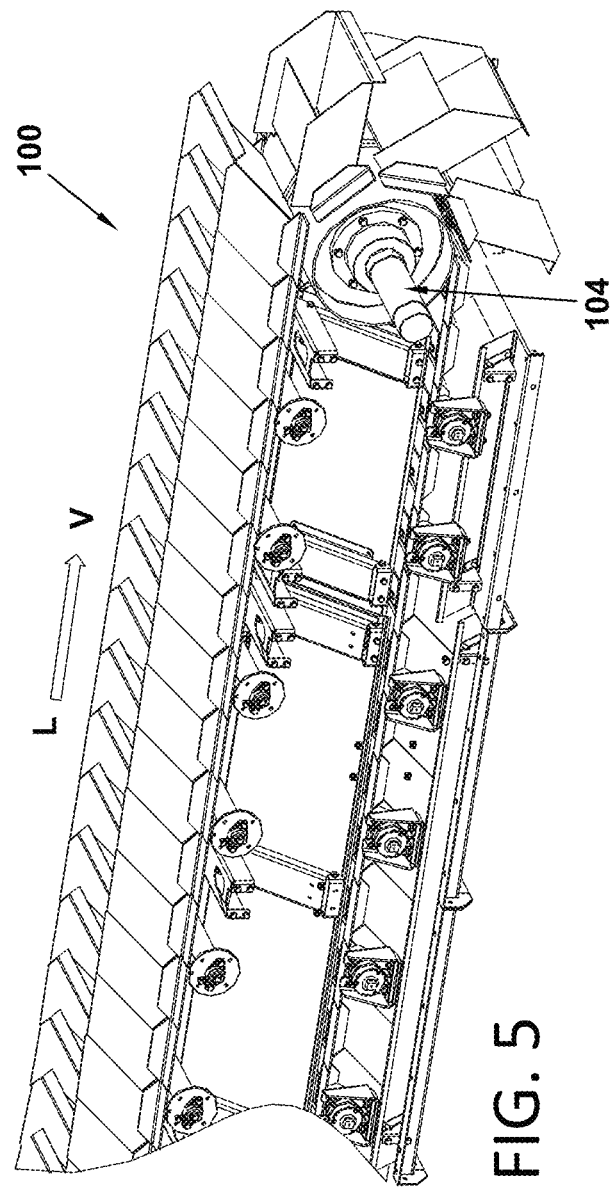
FIG. 4
FIG. 5

BELT TRANSPORT SYSTEM FOR HIGH FLOWS OF BULK MATERIAL

CROSS-REFERENCE TO RELATED APPLICATIONS

This application is a 371 of PCT/IB2022/052640, filed Mar. 23, 2022, which claims the benefit of priority from Italian Patent Application No. 102021000007001, filed Mar. 23, 2021.

TECHNICAL FIELD OF THE INVENTION

The present invention relates to a container device and to a dry transport system including it, suitable to move high temperature bulk materials, even in presence of fine materials.

The invention is applied, for example, for moving ashes from fossil fuel produced in a combustion chamber, of pellets of Direct Reduced Iron (DRI) leaving a reduction furnace or still of clinkers extracted from a rotary kiln.

ANALYSIS OF PRIOR ART AND DRAWBACKS THEREOF

Dry transport systems of, even high temperature, bulk materials, for example bottom ashes leaving a combustion chamber, are known in the art. Such systems are based upon a conveyor of metal belt type with ring-like closed configuration, which wraps around an engine drum and a return drum arranged at the longitudinal ends of the belt itself. The drums are revolving around transversal axes so as to actuate the belt in motion. The transport path of the latter provides a forward tract, with substantially rectilinear trajectory, between a loading region and an unloading region and a second empty return tract, with substantially rectilinear trajectory too, towards the loading region.

The conveyor belt has a longitudinal loading surface defined by a plurality of plates, typically made of metal, partially superimposed to one another.

The plates carry lateral rails, orthogonal or angled with respect to the loading surface, with function of volumetric containment of the transported material. The plates are fastened, by means of screws or rivets, to a wire mesh acting as motion transmitting element and which then implements the above-mentioned belt.

One of the fundamental planning parameters of the belt conveyors of the above-illustrated type is the volume flow of transportable material. The latter is mainly linked to:
  the cross section available for transport, depending upon the width of the plates;
  the height of the containment lateral rails of the plates; and
  the advance linear speed of the belt in the forward tract.

The increase in the above-mentioned cross section often is limited by already existing encumbrances, especially if it is a modernization project in which the conveyor replaces a pre-existing transport solution. For this reason, one can hardly act on this parameter to increase the flow.

Moreover, in case of height difference between the loading region and the unloading one, the increase in the transport tilting determines critical problems which do not allow to increase the height of the lateral rails and/or the belt linear speed. This particularly in case of material with very low inner friction angle which, above all at high temperature, behaves like a liquid and then it is not transported reliably at relatively high speeds. Therefore, the flow of the above-mentioned systems tends to decrease sensibly when the tilting of the direction of transport increases with respect to the horizontal.

Based upon what is illustrated above, then, the important need for maximizing the volume flow of the dry transport systems of the considered type is not met by the transport solutions available in the art.

SUMMARY OF THE INVENTION

The technical problem placed and solved by the present invention is then to provide a transport system allowing to meet the above-illustrated need with reference to the known art.

Such problem is solved by a transport container according to claim 1 and by a transport system including it.

Preferred features of the present invention are set forth in the depending claims.

The present invention provides a belt transport system comprising a plurality of containment devices, or containers, which replace the traditional plates with lateral rails and which have a particular shape suitable to guarantee optimum moving conditions and stability for the transported material.

In a preferred configuration, each container is formed by the following elements, described with reference to the direction of transport:
  a front wall, adjacent to a previous container;
  a rear wall, adjacent to a following container;
  a bottom wall, provided with holes, or other means, for connecting the container to the conveyor belt;
  two lateral walls, lying on a vertical plane and converging with respect to the direction of advancement towards the front wall, so as to be contained by the lateral walls of the previous container and to contain the lateral walls of the following container.

Preferably, each container even provides stiffening means, inside a containment volume defined by the above-mentioned walls, in form of a, for example tubular, element, connecting the front wall to the rear one.

In a preferred embodiment, the direction of transport can be tilted. Advantageously, the container is made, wholly or partially, of metal and/or of a material resistant to the high temperatures of the transported material. The container, once received the material to be transported in a loading region of the system, protects it and in case preserves the thermal content thereof as far as the unloading region.

In a preferred configuration, the above-mentioned front wall defines an acute angle with the direction of advancement (that is outside the above-mentioned containment volume), advantageously variable in a range of approximately 0°-75°.

In a preferred configuration of the invention, the front and rear walls of the metal container have both an acute angle with the direction of advancement (outside and inside said containment volume, respectively), in particular resulting parallel to one another, above all to ease the loading phase in case of strong height differences between the transport end regions.

The angular value can be determined based upon the tilting of the conveyor itself and upon the overall dimension requirements dictated by the plant layout, so as to implement a high containment volume sized to obtain the project volume flow, for example up to a conveyor speed of 0.5 m/s.

Moreover, the lateral and front walls of each container can have a height up to 60% higher than the rear wall.

Each metal container can be implemented by producing the portions thereof and by assembling them, for example by means of continuous welding, or in a single solution such as by casting by means of the so-called "lost foam" technique known in the art.

The container of the invention allows an effective and reliable transport even for high transport tilting and/or high flows of transported material, especially bulk material, even fine and/or high temperature material, by allowing the complete confinement thereof within a transport volume defined by the walls of each container.

The container is particularly suitable to the use in a belt transport system of the mentioned type, but even likely to be applied differently.

In preferred embodiments, the containers are connected mechanically to a motion transmission mesh, typically a wire mesh, placed below them which implements the conveyor belt. The motion transmission wire mesh can be configured like a ring, similarly to what described in relation to the known art.

The transport containers can be associated in continuous series to the transport mesh, or to other conveyor belt, that is several containers can follow each other in longitudinal sequence according to the direction of transport with a mutual engagement between the respective lateral walls as described above. Such mutual engagement determines a guiding effect, that is preventing differentiated lateral motions, for the adjacent (following) container.

The shape and arrangement of the containers confers compactness to the transport section and prevents each container from misaligning with respect to the following and previous adjacent containers, by guaranteeing reliability during the phases for loading and unloading the material and during the transport itself.

In a preferred embodiment, the front wall of each container, or of some thereof, can be provided with an overlapping flap with the rear wall of the container preceding it. This allows to compensate possible thermal expansions, along the direction of travel, of the motion transmission belt, by improving the above-said reliability and continuity of loading the material, even at high temperatures.

Based upon a preferred arrangement, the containers have adjacent bottom walls connected to the conveyor belt, and each front wall, with the overlapping flap, covers the upper end of the rear wall of the container preceding it, by constituting a continuous transport and containment volume.

Such configuration, even without the overlapping flap, allows to implement volume flows beyond 200 m³/h.

The forward tract of the conveyor belt can be sustained by a plurality of support rollers, revolving around a transverse axis, advantageously positioned with constant pitch depending upon the conveyor tilting. The return tract of the above-mentioned belt, downstream of the material unloading, can be supported by lateral cantilevered rollers, thereupon transverse extensions of the lateral walls of the containers can rest. The contiguity of the containers allows a support continuity.

The transport system can be confined and enclosed in a casing, advantageously made of metal and in case thermally isolated.

Depending upon the application needs, each container too can provide a thermal insulation or be made in a refractory material for the preservation of the thermal content of the transported material.

Based upon the type of the transported material and upon the expected amount of fine materials contained therein, the transport system can be provided with means for cleaning the bottom of the casing, for example implemented by means of motorized scraper chains, known in the state of art.

In case of tilted conveyor belt with respect to the horizontal, such cleaning means can be positioned mainly at the loading region and collect the fine materials in a collection region.

The advantages connected to the use of the container and of the transport system of the invention are considerable with respect to what can be obtained with conveyors of known art and which can be synthetized, at least partially, in the following points:

transport in safe and confined way of bulk material even in presence of fine and/or high temperature materials, without any loss of material in the forward tract;

management of high volume flows of material, in synergy with the speed of the conveyor belt and of the volume of the single container, with reduction of overall dimensions;

possibility of reaching high height differences between loading and unloading region.

Other advantages, features and use modes of the present invention will result evident from the following detailed description of some embodiments, shown by way of example and not for limitative purposes.

BRIEF DESCRIPTION OF FIGURES

The figures of the enclosed drawings will be referred to, wherein:

FIG. 4 shows a schematic lateral view of a sequence of containers according to FIG. 2 in a belt transport system according to a preferred embodiment of the invention;

FIG. 5 shows a lateral perspective view of a variant of the belt transport system of FIG. 4 using containers according to FIG. 1A;

The sizes represented in the above-mentioned figures are to be meant as exemplifying and are not necessarily in proportion.

DETAILED DESCRIPTION OF PREFERRED EMBODIMENTS OF THE INVENTION

Various embodiments and variants of the invention will be described hereinafter, and this with reference to the above-mentioned figures. In the following detailed description, further embodiments and variants with respect to embodiments and variants already treated in the same description will be illustrated limitedly to the differences with what already shown. Moreover, the different embodiments and variants described hereinafter are likely to be used in combination, where compatible.

Figure 1A:
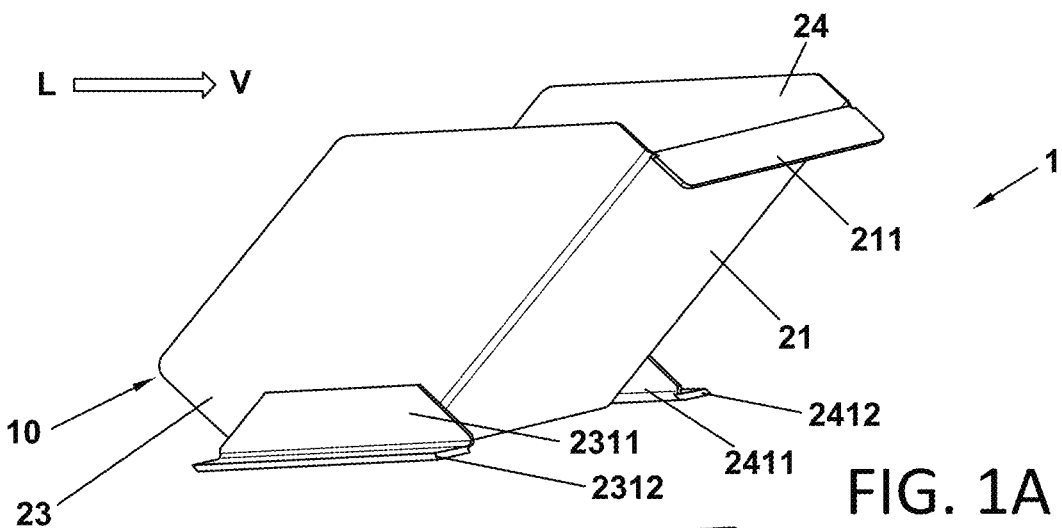
FIGS. 1A to 1C relate to a preferred embodiment of a transport container according to the invention, by showing a front perspective view (with respect to a direction of transport), a top lateral perspective view and an additional front perspective view from a different angulation thereof, respectively.
Figure 1B:
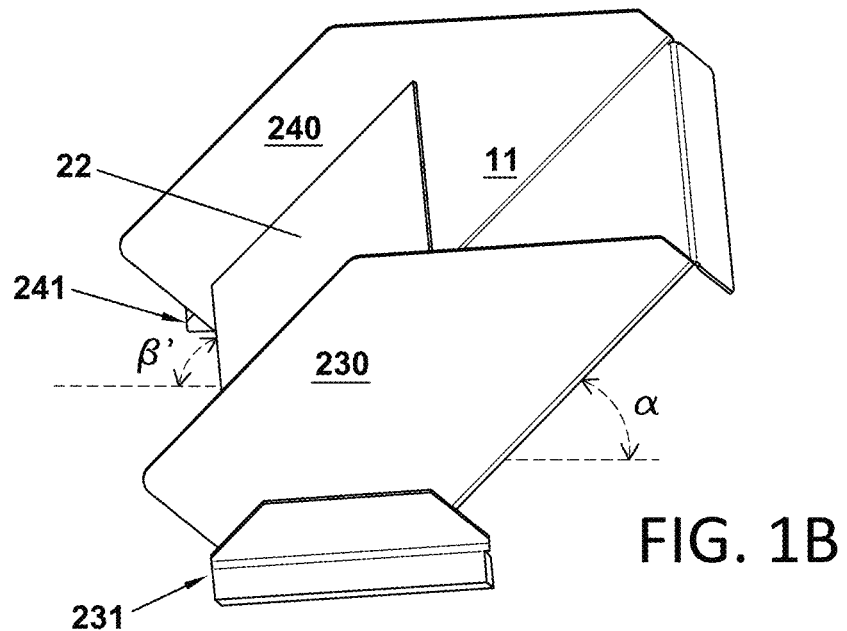
Figure 1C:
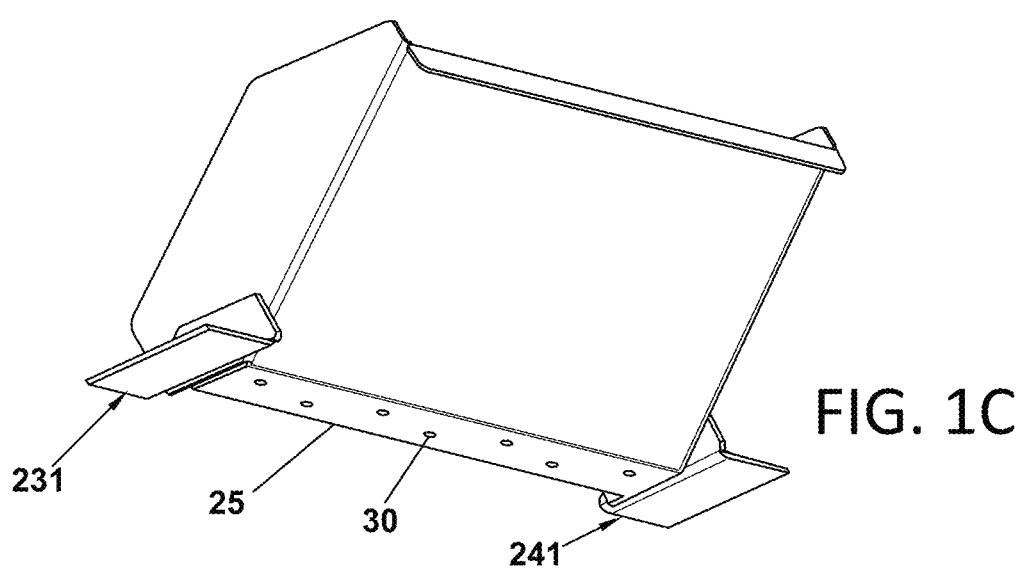

By firstly referring to FIGS. 1A-1C, a transport container, or device, according to a preferred embodiment of the invention is designated as a whole with 1.

The container 1 is configured for the containment of bulk materials, even in lumps, at high temperature in industrial plants and to this purpose it has a main body 10 defining an inner containment volume 11.

In the present example, the main body 10 of the container 1 is wholly made of metal. The container 1 is suitable for use in a belt transport system which will be described hereinafter with reference, for example, to FIG. 5 and herein designated with 100.

The inner volume 11 is defined by a plurality of mutually integral walls, which surround it on the lower, front and rear portion. In the present example, the volume 11, and then the container 1, is open on the upper portion. The above-mentioned walls preferably have a substantially planar development, being implemented in form of plates.

In particular, the main body 10 of the container 1 has a front wall 21 and a rear wall 22, arranged on opposite sides of the container 1 along a longitudinal, or transport, direction L. The front wall 21 is preferably intended for an arrangement upstream of the rear one 22 with respect to a direction of advancement V.

The front wall 21 has an overlapping flap 211 projecting externally with respect to the inner volume 11 and configured to engage, or overlap, the rear wall of an adjacent container, as it will be illustrated in more details hereinafter.

The main body 10 then has a bottom wall 25, carrying means 30 for connecting to a movable belt element 101 of the transport system 100 (shown too, for example in FIG. 5). In the present example, such connecting means 30 comprises one or more seats or holes for fastening elements such as for example screws or bolts.

The front 21 and rear 22 walls rise from the bottom wall 25, on the same side thereof, in particular on the opposite side with respect to the belt element 101, and they are integral thereto.

In the present embodiment, the front wall 21 has a tilting with respect to the bottom wall 25, forming therewith (outside the volume 11) an acute angle α preferably variable in a range of approximately 30°-50°. Still in the present example, even the rear wall has the same tilting, exemplified in FIG. 1B with the supplementary obtuse external angle β'.

In general terms, the two front and rear walls 21 and 22 can have the same tilting or a different angulation with respect to the bottom wall 25.

The main body 10 at last has a first and a second lateral wall, respectively 23 and 24, arranged longitudinally between the front 21 and rear 22 walls and projecting externally with respect to the latter from the opposite side with respect to the front wall 21. Advantageously, the first and the second lateral wall 23 and 24 are mutually converging towards the front wall 21, that is in the direction of advancement V.

As exemplified in FIG. 4, in the present embodiment example the first and the second lateral wall 23 and 24 and the front wall 21 have a height H1 higher, preferably up to 60% higher, than the height H2 of the rear wall 22.

In the present example, the front 21, rear 22 and lateral walls 23 and 24 extend on a respective plane substantially orthogonal to the direction of transport L which, for a horizontal direction of transport, is obviously a vertical plane.

The lateral walls 23 and 24 project longitudinally beyond the rear wall 22 in opposite direction with respect to the direction of advancement V. In other terms, the rear wall 22 is arranged built-in between the lateral walls 23 and 24, that is in advanced position in the direction of transport V. The projecting portions of the walls 23 and 24 are designated in exemplifying way with 230 and 240 in FIG. 1B.

In the present embodiment example, each one of the first and second lateral wall 23 and 24 has an external flange designated with 231 and 241, respectively. Each flange 231, 241 is applied, or obtained, outside the volume 11, at a lower portion of the respective lateral wall 23, 24 adjacent or proximate to the bottom wall 25. Preferably, each flange 231, 241 has a substantially "L"-like shape in cross section, with a first branch 2311, 2411 parallel, and adherent, to the lateral wall 23, 24 and another branch 2312, 2412, substantially orthogonal or however angled with respect to the first one, projecting transversally towards outside and advantageously parallel, or substantially parallel, to the bottom wall 25. The flanges 231, 241 then implement, through the second arms 2312 and 2412, extensions of a base plane of the container defined by the bottom wall 25.

In the present example, the first branches 2311, 2411 of the flanges 231, 241 have, each one, a substantially polygonal plan shape, in particular a substantially trapezoidal shape, advantageously like an isosceles trapezium.

Each flange 231, 241 can project even longitudinally beyond the lateral wall 23, 24 on the side of the front wall 21.

As illustrated hereinafter, the flanges 231, 241, and in particular the transversal branches 2312 and 2412, are configured to support the container 1 in a return stroke of the conveyor belt 101.

In the present context, terms such as "upper", "lower", "lateral", "front", "anterior" and "posterior" are used in relation to the arrangement of FIG. 1A and to the direction and course of transport designated therein. It is to be meant that the container 1, and the conveyor belt thereto it is integral, can be used in a different orientation, in particular not horizontal, the same dictions being maintained, for illustrative uniformity, as they are indeed referred to the direction and course of transport.

Figure 2:
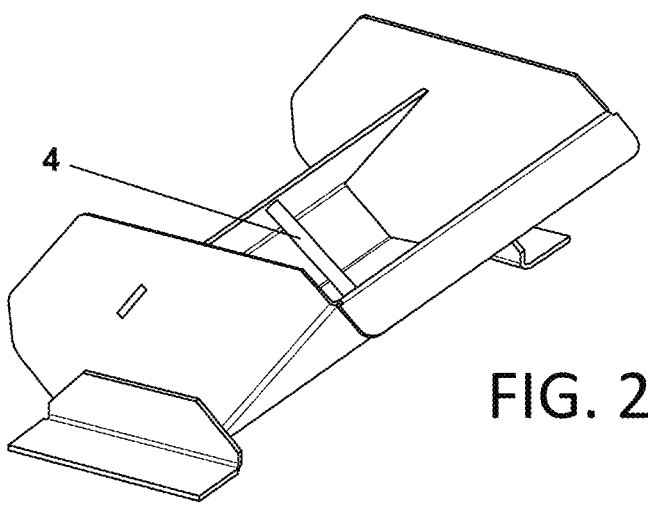
FIG. 2 relates to an embodiment variant of the container of FIG. 1A, by showing a top perspective view thereof.

In an embodiment variant shown in FIG. 2, the container 1 further comprises a reinforcing element 4, preferably in form of a cross member or upright, interposed between the front wall 21 and the rear wall 22 and extending parallelly or angled with respect to the bottom wall 25. Advantageously, the reinforcement element 4 has tubular structure. The reinforcement element 4 acts as spacer between the front 21 and rear 22 walls and it allows the stiffening thereof. The reinforcement element 4 is preferably adopted in case the operating conditions provide high temperatures and/or flow of the material.

Figure 3A:
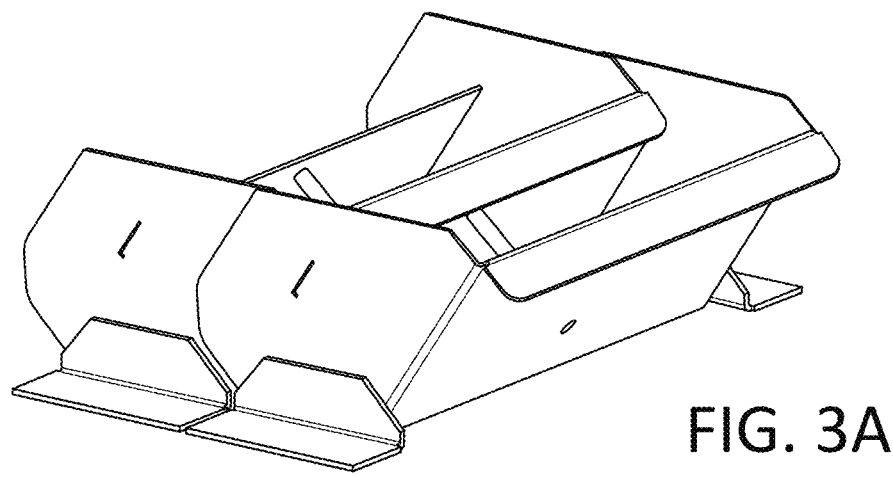
FIGS. 3A and 3B show two containers according to FIG. 2 arranged side by side in a direction of transport, by showing a front perspective view and a lateral perspective view thereof, respectively.

As shown in FIGS. 3A e 3B, the container 1 is suitable to be used in a belt transport system and arranged in sequence with other identical containers along the direction of transport L, so as to implement a mutual engagement with the previous container and with the following one. In particular, the lateral walls 23 and 24 can house between them the front wall and projecting portions of the lateral walls of an adjacent container, the latter preferably arranged downstream of the sequence rispetto al direction of advancement V.

Correspondingly, the front wall 21 and part of the lateral walls 23 and 24 can engage inside the lateral walls of a container arranged upstream of the sequence.

Figure 3B:
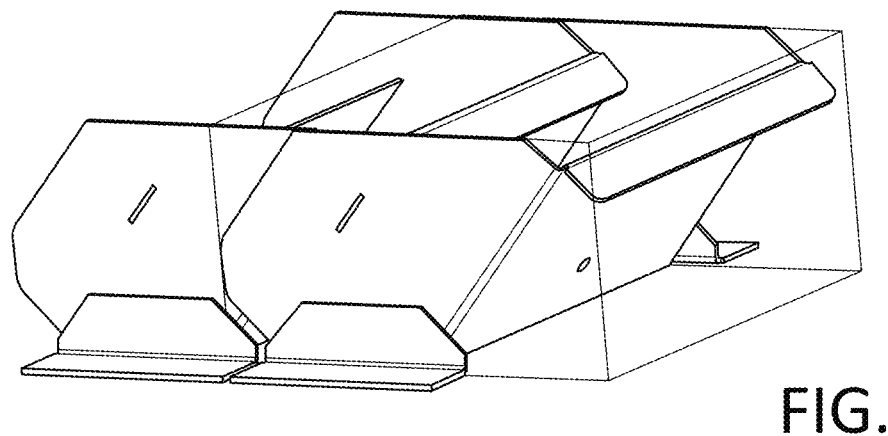

FIG. 3B highlights, by means of a fictitious parallelepiped shape, the alignment function of the lateral walls 23 and 24 in the above-mentioned engagement arrangement. The latter, as said, extend on a plane orthogonal to the direction of transport L, in particular vertically, and converge in the direction of advancement V so as to be partially contained by the lateral walls of the previous container and partially contain the lateral walls of the following container.

As mentioned above, a belt transport system using a plurality of containers as described above is shown in FIGS. 4 to 6 and designated as a whole with 100. The containers, two thereof designated by way of example with 1 and 1' in FIG. 4 to highlight the arrangement in sequence thereof, are fastened to the movable belt element 101 at their own bottom walls 25.

The adjacent containers 1, 1' engage mutually, as above illustrated, to form a continuous transport region.

The system 1 mainly comprises the above-mentioned movable element, or conveyor belt, 101, configured like a ring, wrapping according to a path closed around an engine drum 104 and a (not visible) drum).

The belt 101 then acts as element for transmitting the motion between an engine which actuates the roller 103 and the containers 1, 1'.

Preferably, the belt element is implemented in form of wire mesh.

Advantageously, the system 100 has a containment casing 110, preferably made of metal, which houses the belt 101 and the containers 1, 1' fastened thereto.

Figure 6:
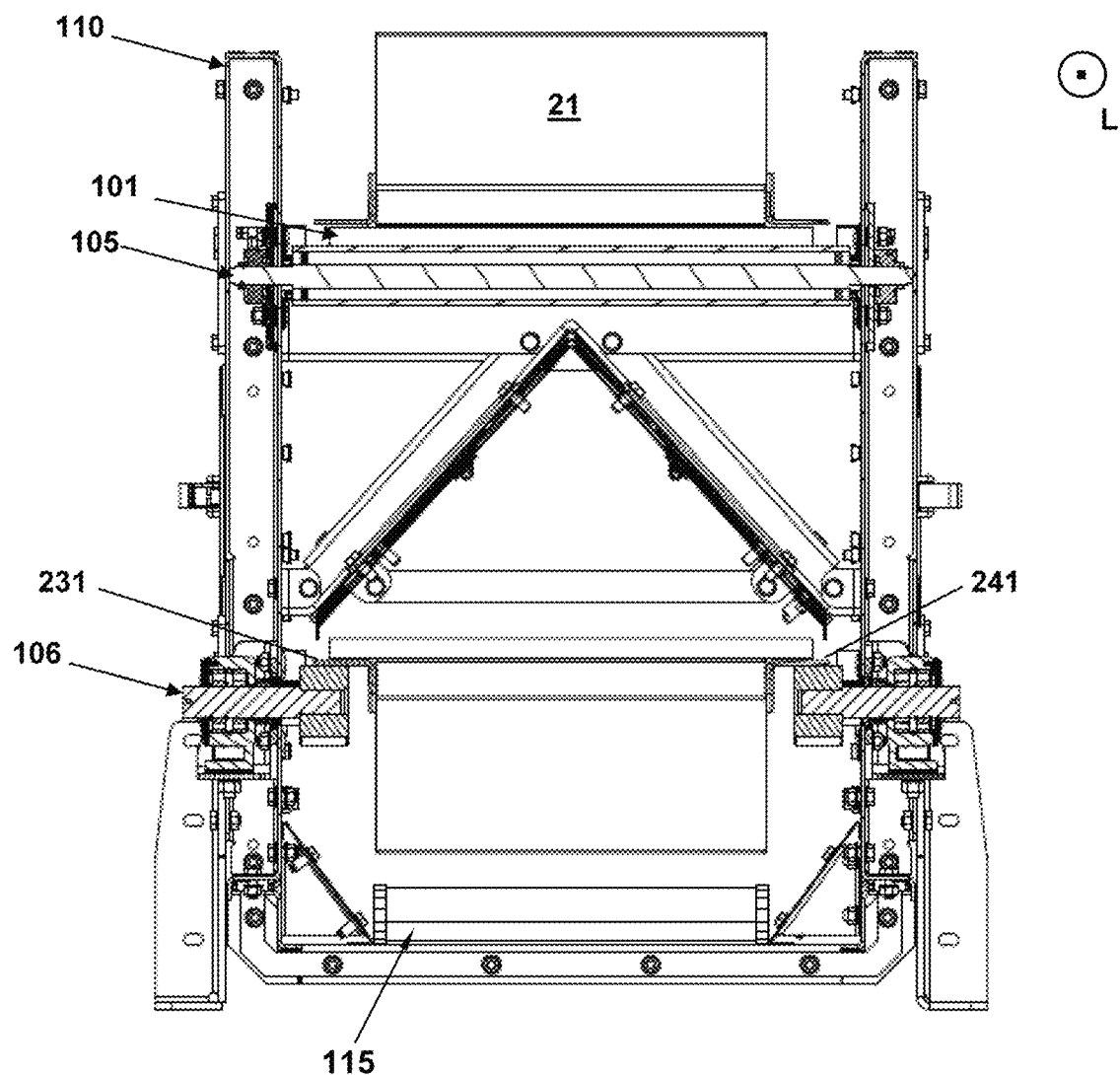
FIG. 6 shows a cross section view of the transport system of FIG. 4 or 5.

As better visible in the cross section of FIG. 6, the conveyor belt 101 is supported, in the forward stroke, by idle rollers 105 revolving around its own transverse axis and advantageously arranged at constant longitudinal pitch in the direction of transport L.

In the return stroke, the conveyor belt 101 can be supported by cantilevered rollers 106, revolving too around a transverse axis. Upon the latter the lateral flanges 231, 241 of the containers 1 rest, in particular by means of the projecting branch 2312, 2412. In a preferred embodiment variant, and based upon the type of the transported material and upon the expected amount of fine materials contained therein, the transport system 100 can be provided with means for cleaning the bottom of the casing 110, for example in form of preferable motorized scraper chains 115 illustrated in FIG. 6, which are of type known per se to the state of the art (the depiction of the scraper chains 115 is generic and is not meant to impart any specific details of the scraper chains).

In case of system with tilted direction of transport L with respect to the horizontal, the means for cleaning the bottom is positioned mainly in the loading region and collect the fine materials to a collection point.

The transport system 100 can be used for example for dry handling of DRI "Direct Reduced Iron" leaving the reduction furnace/reactor, of bottom ashes or fly ash produced by a combustion chamber or of cement clinker coming out of a rotary kiln.

The present invention has been so far described with reference to preferred embodiments thereof. It is to be meant that other embodiments belonging to the same inventive core may exist, as defined by the protective scope of the herebelow reported claims.

The invention claimed is:

1. A transport container configured for use in a system for transporting high temperature bulk materials in industrial plants, which transport container has a main body defining an internal confinement volume by means of a plurality of mutually fixed walls, said plurality of mutually fixed walls comprising:
   a front wall and a rear wall, arranged on opposite sides of the container along a transport direction, the front wall being intended for an arrangement upstream of the rear one with respect to a direction of advancement;
   a bottom wall, carrying connecting means for connecting the transport container to a movable belt of the system, wherein said front wall and said rear wall are substantially parallel to one another and both inclined with respect to said bottom wall and to said transport direction, by forming with said bottom wall an acute angle, externally and internally with respect to said internal confinement volume, respectively;
   a reinforcing element in the form of a cross member or upright, interposed between said front wall and said rear wall;
   a first lateral wall and a second lateral wall, arranged longitudinally between said front and rear walls and having portions projecting externally with respect to said rear wall from the opposite side with respect to said front wall, which first and second lateral walls are mutually converging towards said front wall,
the transport container being configured to be arranged in sequence with other identical containers along the transport direction with the front wall and part of said first and second lateral wall housed between protruding portions of the first and second lateral walls of an adjacent container, the adjacent container arranged upstream of the sequence with respect to the direction of advancement.

2. The transport container according to claim 1, wherein said connecting means comprises one or more seats for fastening elements.

3. The transport container according to claim 1, wherein said front wall and said rear wall have a same inclination with respect to said bottom wall, forming with it an acute angle variable in a range of approximately 30°-50°.

4. The transport container according to claim 1, wherein said first and second lateral wall or said front wall have a height higher than that of said rear wall.

5. The transport container according to claim 4, wherein said first and said second lateral wall or said front wall have a height up to 60% higher than that of said rear wall.

6. The transport container according to claim 1, wherein said front wall has an overlapping flap projecting externally with respect to said internal volume and configured to engage, or overhang, the rear wall of an adjacent container.

7. The transport container according to claim 1, wherein said portions projecting externally of said lateral walls are configured for the mutual engagement with the lateral walls of an adjacent container.

8. The transport container according to claim 7, wherein said adjacent container is arranged downstream of the sequence in the transport direction.

9. The transport container according to claim 1, which is made entirely or predominantly of metal.

10. The transport container according to claim 1, wherein each one of said first and said second lateral wall has a projecting flange, or extension extending transversely outwards of the container.

11. The transport container according to claim 10, wherein said projecting flange is configured to support the container in a return stroke of a conveyor belt.

12. A transport system for dry handling of high temperature bulk materials in industrial plants, comprising:
   a movable belt element of a mesh type, configured as a ring; and
   a plurality of transport containers each according to claim 1, arranged adjacent to each other according to a direction of transport and fixed to said movable belt element at their own bottom walls.

13. The transport system according to claim 12, having a containment casing which houses said movable belt element and said containers and comprising means for cleaning the bottom of the casing.

14. The transport system according to claim 13, having means for supporting a return stroke of said movable belt element, upon which said lateral flanges of said transport containers rest.

15. The transport system according to claim 13, wherein the means for cleaning includes scraper chains.

16. The transport system according to claim 14, wherein said means for supporting a return stroke of said movable belt element include cantilevered rollers upon which said lateral flanges of said transport containers rest.

17. The transport system according to claim 12, which is a dry transport system of DRI ("Direct Reduced Iron") leaving the reduction furnace/reactor, of bottom ashes or fly ash produced by a combustion chamber or of cement clinker coming out of a rotary kiln.

* * * * *